(12) United States Patent
Garcia

(10) Patent No.: US 7,988,772 B2
(45) Date of Patent: Aug. 2, 2011

(54) AIR/OIL SEPARATOR FOR TRANSMISSIONS AND TRANSAXLES

(75) Inventor: Pete R Garcia, Canton, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 576 days.

(21) Appl. No.: 12/126,511

(22) Filed: May 23, 2008

(65) Prior Publication Data

US 2009/0288378 A1   Nov. 26, 2009

(51) Int. Cl.
*B01D 19/00* (2006.01)
(52) U.S. Cl. ........... 96/212; 95/261; 184/6.23; 184/6.24
(58) Field of Classification Search ............... 96/209, 96/210, 211, 212; 95/261; 184/6.23, 6.24
See application file for complete search history.

(56) References Cited

U.S. PATENT DOCUMENTS

| | | | | |
|---|---|---|---|---|
| 1,440,808 A * | 1/1923 | Wineman | ...... | 96/210 |
| 2,034,914 A * | 3/1936 | Lanser | ...... | 96/174 |
| 3,722,624 A * | 3/1973 | Buckland | ...... | 184/6.11 |
| 3,771,290 A * | 11/1973 | Stethem | ...... | 96/210 |
| 4,363,641 A * | 12/1982 | Finn, III | ...... | 96/156 |
| 5,203,891 A * | 4/1993 | Lema | ...... | 96/210 |
| 5,587,068 A * | 12/1996 | Aho et al. | ...... | 96/210 |
| 6,458,191 B1 * | 10/2002 | Lingelem et al. | ...... | 96/209 |
| 7,811,364 B2 * | 10/2010 | Saito | ...... | 96/174 |
| 2007/0163442 A1 * | 7/2007 | Saito et al. | ...... | 96/209 |
| 2008/0179227 A1 * | 7/2008 | Saito | ...... | 210/109 |

* cited by examiner

*Primary Examiner* — Duane Smith
*Assistant Examiner* — Douglas J Theisen

(57) ABSTRACT

An air/oil separator includes a housing having an inlet for aerated oil or hydraulic fluid and outlets for the separated air and oil or fluid. The housing is generally cylindrical and defines an upper, inlet portion, a center, separator portion and a lower collector portion. The upper, inlet portion of the housing includes a first, tangential inlet passageway which merges with a second, spiral or circular passageway. The spiral or circular passageway communicates with the cyclonic separator portion which may be either cylindrical or frusto-conical. A coaxial outlet in the upper, inlet portion allows separated air to return to the engine or transmission housing while an outlet in the lower, collector portion returns oil or hydraulic fluid to the device.

14 Claims, 5 Drawing Sheets

AIR/OIL SEPARATOR FOR TRANSMISSIONS AND TRANSAXLES

FIELD

The present disclosure relates to an air/oil separator and more particularly to an air/oil separator for use with automatic transmissions and transaxles.

BACKGROUND

The statements in this section merely provide background information related to the present disclosure and may or may not constitute prior art.

Dry sump lubrication systems are increasingly popular in both engines and transmissions. In dry sump systems, oil is stored in a sump that, unlike wet sump systems, is separate from the crankshaft and main bearings in an engine and from the gear sets and clutches in a transmission. After use in the engine or transmission, oil is pumped out by scavenger pumps acting through oil pick-ups appropriately placed in the device's underside and is returned to the main sump for recirculation. Unfortunately, not only is the typical lubrication system not sealed off from the environment but also oil and hydraulic fluids have a marked affinity for air. Consequently, air becomes entrained in the oil or hydraulic fluid. It has also been found that the more effective the scavenger pumps and oil pumps are, the greater the quantity of air entrained in the oil.

Since air does not lubricate engine or transmission components, nor does it provide cooling to such components, as effectively as oil, unless the air is removed, even though the requisite volume of oil is seemingly being provided to an engine or transmission to lubricate and cool the components, in fact, the lubrication and cooling will be insufficient. As a consequence, the expected service life of engine and transmission components may not be realized.

Clearly there are issues associated with dry sump lubrication systems and the present invention is directed to ameliorating one issue.

SUMMARY

The present invention provides an air/oil separator for use with engines, transmissions and transaxles. The separator includes a housing having an inlet for aerated oil or hydraulic fluid and outlets for the separated air and oil or fluid. The housing is generally cylindrical and defines an upper, inlet portion, a center, separator portion and a lower collector portion. The upper, inlet portion of the housing includes a first, tangential inlet passageway which merges with a second spiral or circular passageway. The spiral or circular passageway communicates with the cyclonic separator portion which may be either cylindrical or frusto-conical. A coaxial outlet in the upper, inlet portion allows separated air to return to the engine or transmission housing while an outlet in the lower, collector portion returns oil or hydraulic fluid to the device. Such tangential and spiral feed of the aerated oil into the separator portion forms a vortex creating centrifugal forces which cause oil droplets to impact and agglomerate on the walls of the separator. This same process causes the lighter, liberated air to collect in the center of the separator. As the oil is drawn down the walls of the separator by gravity, the air flows out the outlet in the top of the separator.

Thus it is an object of the present invention to provide an air/oil separator for an engine, transmission or transaxle.

It is a further object of the present invention to provide an air/oil separator for an engine, transmission or transaxle having a dry sump lubrication system.

It is a still further object of the present invention to provide an air/oil separator for an engine, transmission or transaxle having a housing defining upper, center and lower portions.

It is a still further object of the present invention to provide an air/oil separator for an engine, transmission or transaxle having a housing defining upper inlet, center separator and lower collector portions.

It is a still further object of the present invention to provide an air/oil separator for an engine, transmission or transaxle having a housing defining an inlet passageway having tangential and spiral or concentric portions.

Further objects, advantages and areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
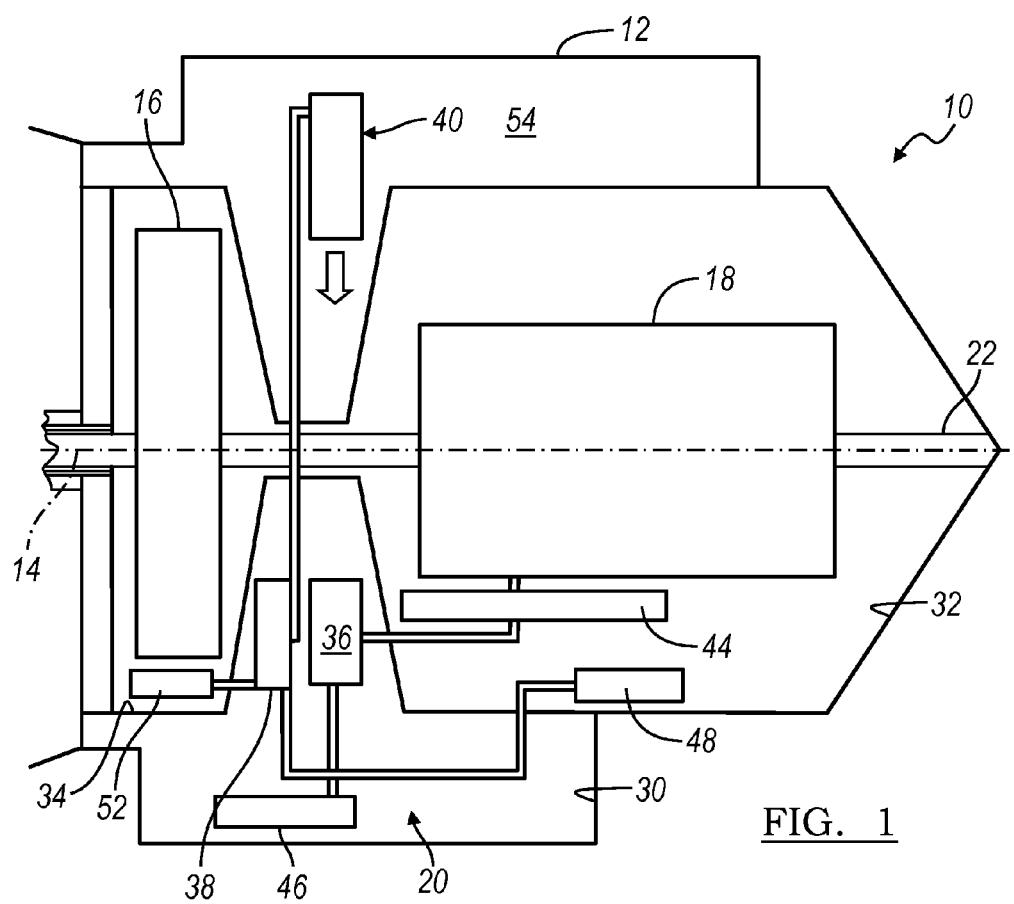
FIG. 1 is a schematic diagram of an exemplary dry sump transmission incorporating an air/oil separator according to the present invention.

With reference now to FIG. 1, a portion of an exemplary automatic transmission is illustrated and generally designated by the reference number 10. The automatic transmission 10 includes a housing 12, an input shaft or member 14, a dual clutch assembly 16, a plurality of gear sets or assemblies 18, a hydraulic system 20 and an output shaft or member 22. The input shaft 14 is driven either directly by the output of a prime mover such as an internal combustion gas, Diesel engine or a hybrid power plant or through a torque converter (all not illustrated) and drives the dual clutch assembly 16. The dual clutch assembly 16, in turn, selectively drives the plurality of gear sets 18. The dual clutch assembly 16 and the plurality of gear sets 18 cooperate to provide a plurality of forward and reverse speed or gear ratios to the output shaft 22. The output shaft 22 is coupled to and drives and final drive unit or transfer case (both not illustrated). It should be appreciated that the exemplary automatic transmission 10 may include more or fewer components and may be a different design such as a multiple planetary gear set type and still fall within the broad purview of the present invention.

The hydraulic system 20 is operable to collect, de-aerate, pressurize and distribute hydraulic fluid, such as an oil, throughout the automatic transmission 10 in order to provide cooling, lubrication and control to the dual clutch assembly 16 and the plurality of gear sets 18. The hydraulic system 20 includes a first reservoir 30, a second reservoir 32, a third reservoir 34, a first pump 36, a second pump 38, an air/oil separator 40 and a control valve assembly 44.

The first reservoir 30 is a sump or tank for storing at least partially de-aerated hydraulic fluid. The partially de-aerated hydraulic fluid is hydraulic fluid that has been de-aerated to an extent compatible with the hydraulic requirements of the automatic transmission 10. The first reservoir 30 is located between the second reservoir 32 and the third reservoir 34. The second reservoir 32 is a sump or tank for collecting at least partially aerated fluid from the plurality of gear sets 18. Aerated hydraulic fluid is hydraulic fluid having air or other gasses entrained within it to an extent that it is incompatible or undesirable with the hydraulic requirements of the automatic transmission 10. The second reservoir 32 is separate from the first reservoir 30 and is located near the rear of the automatic transmission 10 proximate the output shaft 22. The third reservoir 34 is also separate from the first reservoir 30 and the second reservoir 32 and is located near the front of the automatic transmission 10 proximate the dual clutch assembly 16.

The first or main pump 36 may be one of many types such as, for example, a crescent pump, an impeller pump, a gear pump, a gerotor pump or a vane pump, without departing from the scope of the present invention. The inlet of the first or main pump 36 communicates with a first filter 46 disposed within the first reservoir 30 which removes particulates from hydraulic fluid drawn from the first reservoir 30. The first or main pump 36 provides pressurized hydraulic fluid to the control valve assembly 44.

The second or scavenger pump 38 may also be one of the many types listed above. The inlet of the second or scavenger pump 38 communicates with a second filter 48 disposed within the second reservoir 32 and a third filter 52 disposed within the third reservoir 34 and the outlet of the second or scavenger pump 38 communicates with the air/oil separator 40. The second filter 48 removes particulates from hydraulic fluid drawn from the second reservoir 32 by the second or scavenger and the third filter 52 removes particulates from hydraulic fluid drawn from the third reservoir 33 by the second or scavenger pump 38. The second or scavenger pump 38 provides pressurized hydraulic fluid to the air/oil separator 40. Preferably, the air/oil separator 40 is located in an upper region 54 of the first reservoir 30.

Figure 2:
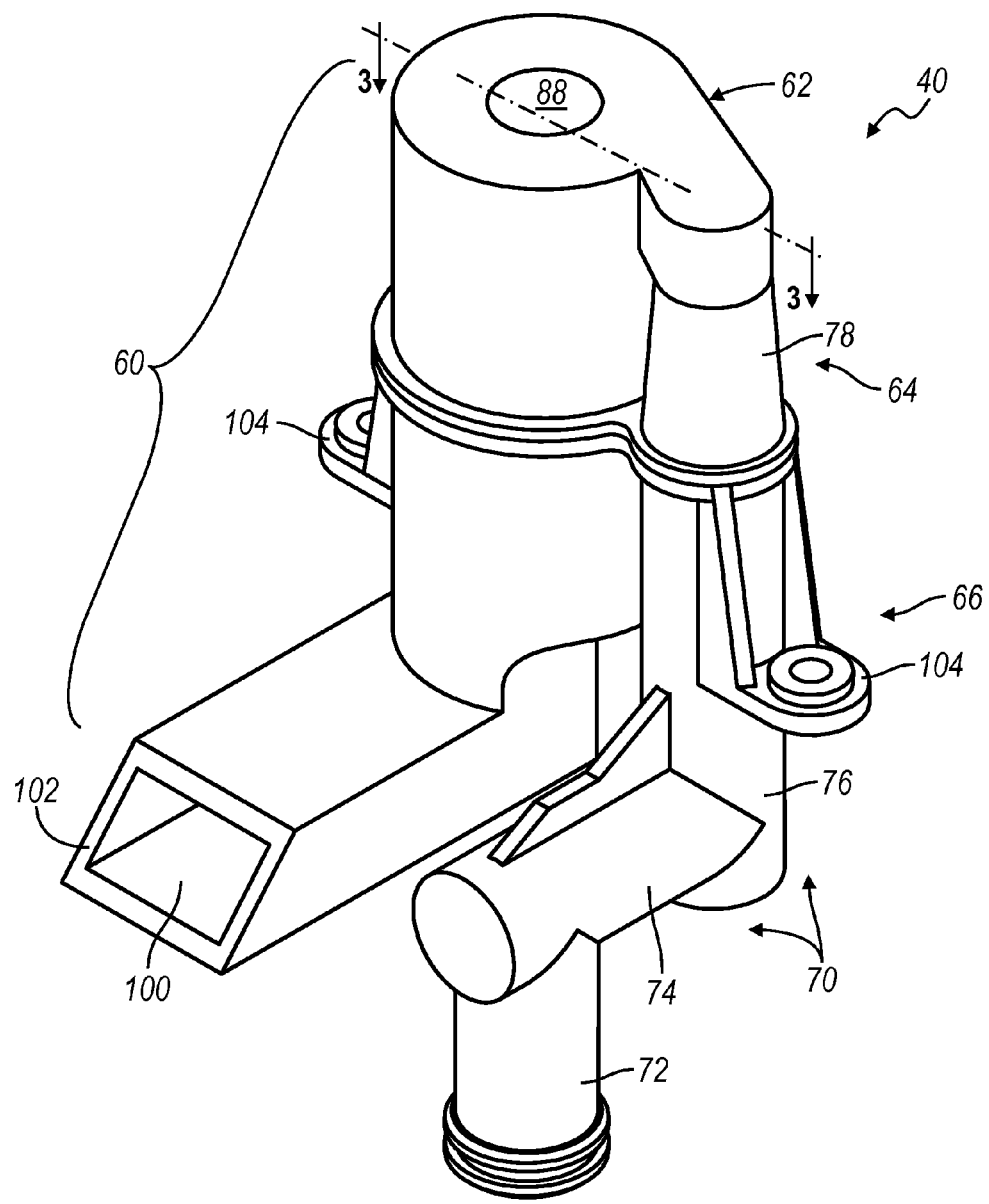
FIG. 2 is a perspective view of an air/oil separator according to the present invention.
Figure 3:
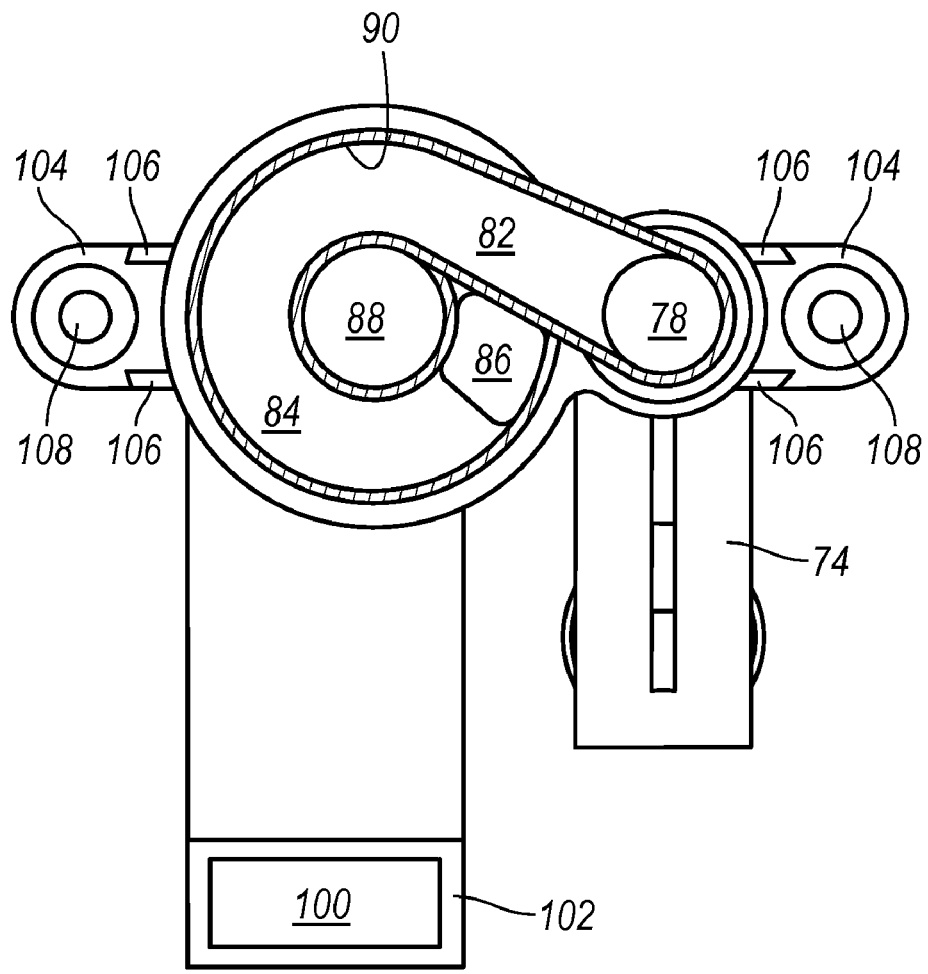
FIG. 3 is a full sectional view of an air/oil separator according to the present invention taken along line 3-3 of FIG. 2.

Referring now to FIGS. 2 and 3, the air/oil separator 40 includes a complexly configured, multiple piece housing 60. The housing 60 preferably includes a top or cap portion 62, an upper body portion 64 and a lower body portion 66 which may be individually molded or formed of a plastic such as ABS or similar material and secured together by adhesives, autogenous bonding or other means such as mechanical fasteners. It will be appreciated, however, that other, comparable physical configurations and assembly techniques are within the purview of this invention.

The lower body portion 66 of the housing 60 includes a segmented inlet duct assembly 70 having a first, vertical passageway or portion 72 which receives aerated oil, i.e., an air/oil mix from the second or scavenger pump 38. The first, vertical portion 72 of the inlet duct assembly 70 communicates with a second, horizontal passageway or portion 74 which, in turn, communicates with a third, vertical passageway or portion 76. Preferably, the first, second and third portions 72, 74 and 76 of the inlet duct assembly 70 define passageways of equal diameter or area. An additional fourth, vertical passageway or portion 78 of the inlet duct assembly 70 is included in the upper body portion 64 of the housing 60. Preferably, the fourth, vertical passageway or portion 78 defines a slight taper or narrowing in the direction of flow which increases the velocity of flow of the aerated oil through the fourth, vertical portion 78 while lowering its pressure.

The fourth, vertical passageway or portion 78 of the inlet duct assembly 70 communicates, at a right angle, with a fifth, tangential passageway or portion 82. The fifth, tangential passageway or portion 82 extends into the upper body portion 64 of the housing 60 and merges with a sixth, circular or spiral passageway or portion 84. The sixth, circular or spiral passageway or portion 84 is preferably concentric with the axis of the housing 60 and extends at least about 270° around this axis to impart a swirling or circular motion to the aerated oil. The sixth, circular or spiral passageway or portion 84 terminates in a streamlined outlet 86. The top or cap portion 62 of the housing 60 closes off the fifth, tangential passageway or portion 82 and the sixth, circular or spiral passageway or portion 84 and includes a preferably circular passageway and opening 88 defined by a cylindrical wall 90 which is concentric with the axis of the housing 60 and communicates with the interior 92 of the housing 60 but not the sixth, circular passageway or portion 84.

Figure 4:
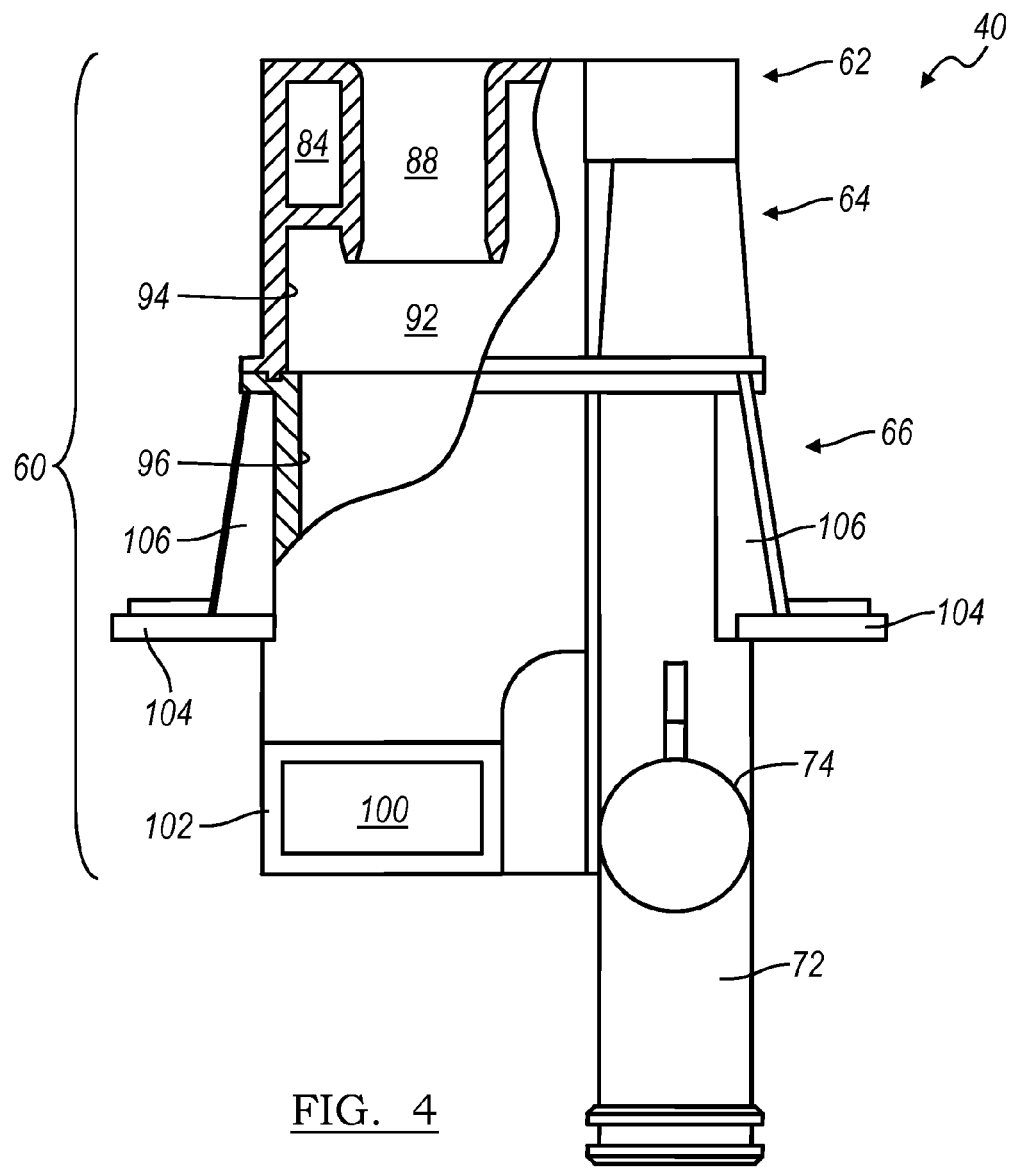
FIG. 4 is a front elevational view of an air/oil separator according to the present invention with portions broken away.

Referring now to FIGS. 3 and 4, The interior 92 of the housing 60 is defined by an upper cylindrical wall 94 which is formed by the upper body portion 64 and a lower cylindrical wall 96 which is formed by the lower body portion 66. At the lower region of the interior 92, the lower cylindrical wall 96 of the housing 60 tapers inwardly and merges with a generally rectangular horizontal outlet duct or passageway 100. The outlet duct or passageway 100 terminates in an oblique mouth 102. The lower body portion 66 also preferably includes a pair of opposed, outwardly extending mounting ears or lugs 104 reinforced by pairs of webs or gussets 106. Each of the mounting ears or lugs 104 includes a through opening 108 which is adapted to receive a fastener (not illustrated) for securing the air/oil separator 40 within the housing 12 of the transmission 10.

Figure 5:
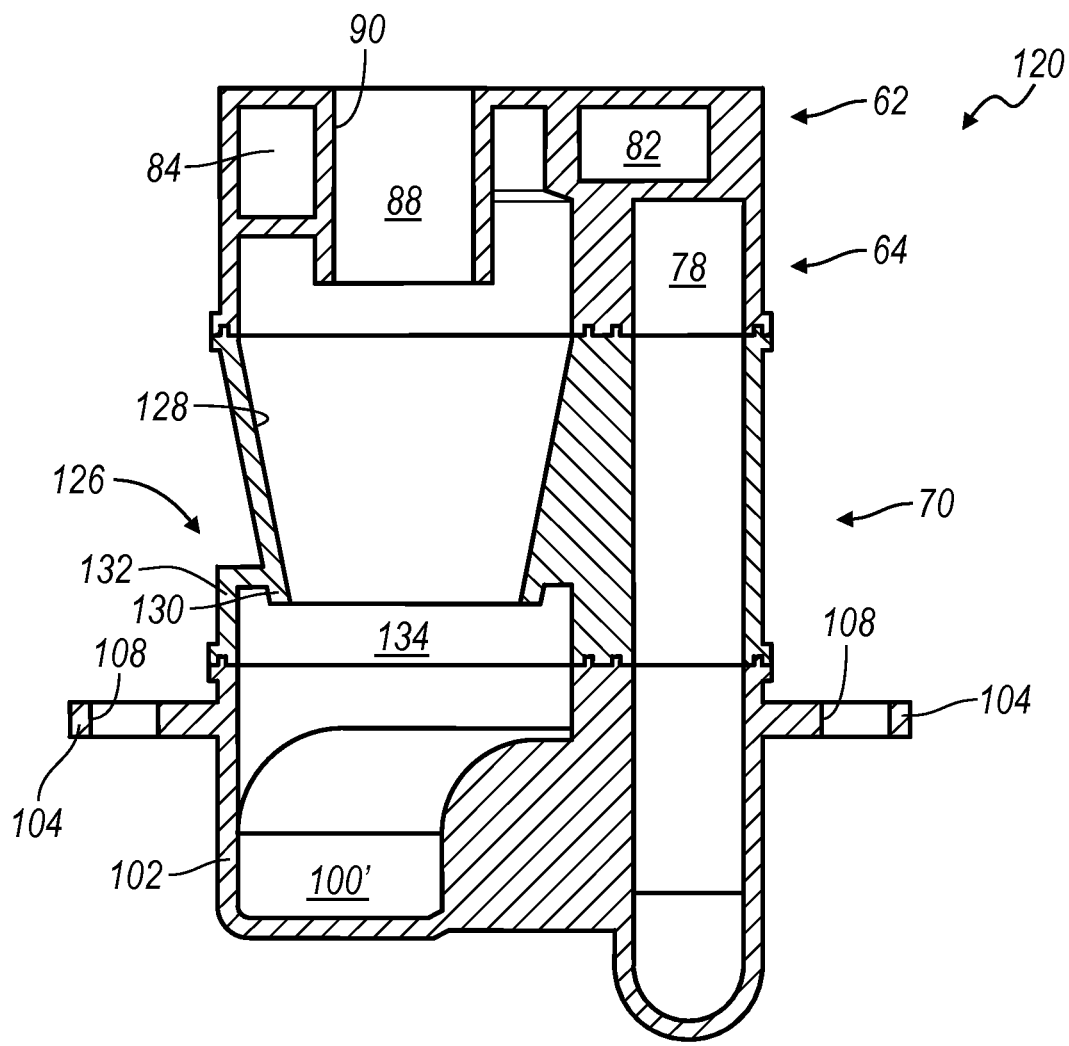
FIG. 5 is a full sectional view of an alternate embodiment of an air/oil separator according to the present invention.

Referring now to FIG. 5, an alternate embodiment of an air/oil separator is illustrated and generally designated by the reference number 120. The alternate embodiment air/oil separator 120 is the same in many respects as the air/oil separator 40 and includes the top or cap portion 62 defining the opening 88, the upper body portion 64 including the fifth, tangential passageway or portion 82, the sixth, circular or spiral passageway or portion 84 and the cylindrical wall 90 as well as the inlet duct assembly 70. The air/oil separator 120 includes a different lower body portion 126. Here, the lower body portion 126 has a significant downward and inward taper such that a lower wall 128 defines a frustum of a cone, i.e., is frusto-conical. The frusto-conical lower wall 128 terminates in a depending lip 130 which is received within and spaced from a cylindrical outer wall 132 which defines an anti-swirl chamber 134. The anti-swirl chamber 134 has a diameter significantly larger than the smallest diameter of the frusto-conical lower wall 128 (which is defined by the depending lip 130) such that a relatively quiescent zone is created which further assists separation and agglomeration of the oil. The oil moves out of the separator 120 through a generally rectangular horizontal outlet duct or passageway 100'.

In operation, the air/oil separators 40 and 120 according to the present invention provide improved lubrication and cooling performance of oil and hydraulic fluid in engines, transmissions and transaxles by removing entrained air from the oil or fluid, especially in dry sump systems. Aerated oil is supplied to the inlet duct 70 by, for example, the second or scavenger pump 38 of, for example, the automatic transmission 10. The aerated oil is accelerated through the fourth, vertical passageway or portion 78, through the fifth, tangential passageway or portion 82 and around the sixth, circular or spiral passageway or portion 84 which imparts a swirling, circular motion to the aerated oil. The swirling, aerated oil passes through the outlet 86 and enters the interior 92 of the separator 40 or 120 where a fluid vortex is formed. The centrifugal force exerted on the swirling, aerated oil drives the oil into contact with the inner walls 94 and 96 while the less dense air collects in the center of the separators 40 and 120. The air/oil separators 40 and 120 are capable of accelerating the oil laterally to 8750 meters per second for 75 milliseconds.

The substantially air-free oil then collects in the bottom of the separator 40 and flows out the horizontal outlet duct or passageway 100 while the air moves upward through the passageway and outlet 88. The anti-swirl chamber 134 of the alternate embodiment air/oil separator 120, as noted, has a diameter larger than the smallest diameter of the frusto-conical lower wall 128 of the separator 120 thereby causing the exiting fluid to decelerate and further assist air/oil separation.

It should be understood that although the air/oil separators 40 and 120 have been described above in conjunction with a dry sump automatic transmission, they are equally suited for and provide the same benefits in dry sump engines, manual transmissions and transaxles.

The foregoing description of the invention is merely exemplary in nature and variations that do not depart from the gist of the invention are intended to be within the scope of the invention. Such variations are not to be regarded as a departure from the spirit and scope of the invention and the following claims.

What is claimed is:

1. An air/oil separator for use in engines, transmissions and transaxles comprising, in combination,
    a housing having an inlet duct, a generally circular separation chamber defining an axis and having an upper region and a lower region, an oil outlet duct and an air outlet defined by a cylindrical wall in said upper region of said housing, said cylindrical wall defining a portion of said inlet duct and said inlet duct communicating with said upper region of said separation chamber, said oil outlet duct communicating with said lower region of said separation chamber and said air outlet defining an opening concentric with said axis and communicating between said upper region and an exterior of said housing.

2. The air/oil separator of claim 1 wherein said lower region is cylindrical.

3. The air/oil separator of claim 1 wherein said lower region is frusto-conical.

4. The air/oil separator of claim 1 wherein said inlet duct includes a portion oriented tangentially to said axis.

5. The air/oil separator of claim 1 wherein said inlet duct includes a portion extending around said axis.

6. The air/oil separator of claim 1 further including an anti-swirl chamber in said lower region of said separation chamber.

7. The air/oil separator of claim 1 further including a depending lip in said lower region of said separation chamber.

8. An air/oil separator for use with dry sump lubrication systems comprising, in combination,
    an inlet duct,
    a separation chamber defining an axis and having an upper region and a lower region,
    an oil outlet and an air outlet,
    said inlet duct communicating with said upper region of said separation chamber, said oil outlet communicating with said lower region of said separation chamber and said air outlet defining an opening concentric with said axis and communicating between said upper region and an exterior of said housing, and
    wherein said air outlet is defined by a cylindrical wall in said upper region of said housing and said cylindrical wall defines an inner wall of said inlet duct.

9. The air/oil separator of claim 8 wherein said lower region is cylindrical.

10. The air/oil separator of claim 8 wherein said lower region is frusto-conical.

11. The air/oil separator of claim 8 wherein said inlet duct includes a portion oriented tangentially to said axis.

12. The air/oil separator of claim 8 wherein said inlet duct includes a portion extending around said axis.

13. The air/oil separator of claim 8 further including an anti-swirl chamber in said lower region of said separation chamber.

14. The air/oil separator of claim 8 further including a depending lip in said lower region of said separation chamber.

\* \* \* \* \*